(12) United States Patent
Inoguchi

(10) Patent No.: US 7,245,200 B2
(45) Date of Patent: Jul. 17, 2007

(54) DOOR UNLOCKING CONTROLLER AND CONTROL METHOD THEREOF

(75) Inventor: Tohru Inoguchi, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 337 days.

(21) Appl. No.: 10/921,171

(22) Filed: Aug. 19, 2004

(65) Prior Publication Data

US 2005/0073390 A1 Apr. 7, 2005

(30) Foreign Application Priority Data

Aug. 21, 2003 (JP) .............................. 2003-297512

(51) Int. Cl.
*H04Q 9/00* (2006.01)
*H04Q 5/22* (2006.01)

(52) U.S. Cl. .................. 340/5.72; 340/5.62; 340/5.61; 340/5.2; 340/5.8; 340/10.3

(58) Field of Classification Search ............... 340/5.72, 340/5.62, 5.61, 5.2, 5.8, 10.3
See application file for complete search history.

(56) References Cited

U.S. PATENT DOCUMENTS 5,973,611 A * 10/1999 Kulha et al. ................ 340/5.62
6,208,239 B1 * 3/2001 Muller et al. .......... 340/426.35
6,476,517 B1 * 11/2002 Okada ........................ 307/10.2
6,522,241 B1 * 2/2003 Baudard .................... 340/5.61
6,552,649 B1 4/2003 Okada et al.
6,853,296 B2 * 2/2005 Chandebois ........... 340/426.28
6,879,247 B2 * 4/2005 Shimomura et al. ... 340/426.18
2001/0003405 A1 6/2001 Morillon
2003/0038732 A1 2/2003 Watarai et al.

FOREIGN PATENT DOCUMENTS

EP 1107354 A1 6/2001
JP 2000-73635 A 3/2000

* cited by examiner

*Primary Examiner*—Jeffery Hofsass
*Assistant Examiner*—Scott Au
(74) *Attorney, Agent, or Firm*—Birch, Stewart, Kolasch & Birch, LLP

(57) ABSTRACT

When a request to unlock a door of one side portion of a vehicle is input, an ID request signal is transmitted from a first transmitting antenna provided in the one side portion, and an alarm signal is transmitted from a second transmitting antenna provided in the other side portion of the vehicle. A portable unit sends back a portable-unit signal in dependence on the ID request signal and alarm signal. When the portable unit receives the first signal and does not receive the second signal, a door-unlocking control part unlocks the door of the one side portion in dependence on the portable-unit signal received by a receiving antenna.

11 Claims, 6 Drawing Sheets

DOOR UNLOCKING CONTROLLER AND CONTROL METHOD THEREOF

CROSS-REFERENCE TO RELATED APPLICATION

This application incorporates by references the subject matter of Application No. 2003-297512 filed in Japan on 21 Aug. 2003, on which a priority claim is based under 35 U.S.C. §119(a).

BACKGROUND OF THE INVENTION

1. Field of the Invention

The present invention relates to a door unlocking controller and a control method thereof, which control the unlocking of doors of a vehicle in dependence on a signal from a portable unit.

2. Description of the Related Art

Door unlocking controllers have been developed, which control the unlocking of doors of a vehicle such as an automobile without using a mechanical key or remote control key.

For instance, Japanese Laid-Open Patent Publication No. 2000-73635 discloses a conventional technique 1, in which a wide area capable of receiving a wide-area ID request signal is formed around a vehicle by an electronic radio wave whose operating range is relatively wide. If a portable unit entering this wide area sends back portable-unit ID to the vehicle in response to the wide-area ID request signal, instead of the wide area a narrow area capable of receiving a narrow-area ID request signal is formed around each door. If the portable unit enters any one of these narrow areas, the door in that narrow area is unlocked.

Recently, there has been developed another conventional technique 2. In the conventional technique 2, as shown in FIG. 6, a left-side switch 21L and a right-side switch 21R are provided near the left-side door 26L and right-side door 26R of a vehicle 20 to request unlocking of the doors 26L, 26R. Left and right transmitting-receiving antennas 23L, 23R are provided in the left and right center pillars 22L, 22R of the vehicle 20. For example, if a person 25 who holds a portable unit 24 (portable-unit holder 25) makes the right-side switch 21R on, an ID request signal to request the ID of the portable unit 24 is transmitted from the right-side antenna 23R to a region indicated by reference character $R_a$. In response to the ID request signal, the portable unit 24 sends back portable-unit ID. If the portable unit ID corresponds to the vehicle ID given to the vehicle 20, the right-side door 26R of the vehicle 20 is unlocked.

In the above-described conventional technique 1, if a portable unit enters any one of narrow areas, the door in that narrow area is unlocked even when the portably-unit holder has no intention of opening that door. Therefore, this does not always meet the unlocking of a door requested by a portable-unit holder, and there is a possibility that an unnecessary door-unlocking operation will be repeated against the intention of a portable-unit holder. In addition, since it is necessary to always form a wide area around a vehicle, it can not be said to be efficient.

Therefore, it is desirable that door-unlocking control be efficiently performed according to the intention of a portable-unit holder.

On the other hand, in the conventional technique 2, either the left-side switch 21L or the right-side switch 21R is operated, so it is found that the holder 25 of the portable unit 24 has an intention of unlocking a door. Thus, in the conventional technique 2, the unlocking of a door can be controlled according to the intention of the portable-unit holder 25. In addition, since an ID request signal is transmitted after either of the switches 21L, 21R is operated, a wide area such as that of the conventional technique 1 does not need to be formed at all times and therefore it is efficient.

However, the conventional technique 2 has a new problem that is to be described below. That is, as shown in FIG. 6, the ID request signal transmitted from the right-side antenna 23R leaks out to the left side of the vehicle 20. For that reason, there is a possibility that the leakage will cause a new safety problem. The leakage region in this case is indicated by reference character $R_a'$.

For example, as shown in FIG. 7, when a person 30 who does not have the portable unit 24 operates the left-side switch 21L, an ID request signal is transmitted from the left-side antenna 23L to the region indicated by reference character $R_a$. Originally, even if the person 30 who does not have the portable unit 24 operates the left-side switch 21L, the left-side door 26L will not be unlocked. However, when the portable unit 24 of the portable-unit holder 25 is present within the leakage region $R_a'$, the portable unit 24 receives the ID request signal and sends back the portable-unit ID. Thus, even when the person 30 who does not have the portable unit 24 operates the left-side switch 21L, the left-side door 26L is unlocked. As a result, there is a possibility that vehicle security cannot be ensured.

There is a technique for avoiding such a problem. For instance, if the right-side switch 21R is operated, an ID request signal is transmitted from the right-side antenna 23R, and at the same time, electronic radio waves of the same strength as the ID request signal are transmitted from the antennas 23L, 23R. In response to the ID request signal, the portable unit 24 sends back the portable-unit ID, and measures the electric field strengths of the two electronic radio waves and sends back the measured electric field strengths. The vehicle 20 judges that the portable unit 24 (i.e., the portable-unit holder 25) is present in the side where the electric field strength is stronger. For example, if the judged side is the right side of the vehicle, it is judged that the portable-unit holder has operated the right-side switch 21R. And if the portable-unit ID and the vehicle ID correspond to each other, the right-side door 26R is unlocked.

However, in this case, the portable unit 24 needs to have the function of measuring the strength of an electric field, so it becomes large in size and costly. In addition, the portable unit 24 needs to measure the electric field strengths of two radio waves transmitted from both sides of the vehicle 20 and send back the measured data of the two electric field strengths, so this will overload the portable unit 24 of small electric capacity.

SUMMARY OF THE INVENTION

The present invention has been made in view of the above-described problems. Accordingly, it is the primary object of the present invention to provide a door unlocking controller and a control method thereof that are capable of enhancing security by preventing a person not having a portable unit from unlocking a door.

To achieve this end and in accordance with an important aspect of the present invention, there is provided a door unlocking controller for controlling unlocking of a door of a vehicle in dependence on a signal from a portable unit. The door unlocking controller includes input means provided in both side portions of the vehicle for requesting the unlocking of the door; transmission means provided in the side portions of the vehicle; and transmission control means which, when a request to unlock the door is input through the input means provided in one of the side portions of the vehicle, causes the transmission means provided in the one side portion to transmit a first signal and also causes the transmission means provided in the other side portion to transmit a second signal. The door unlocking controller further includes a portable unit for sending back a third signal in dependence on the first signal and the second signal; reception means provided in the vehicle for receiving the third signal sent back from the portable unit; and door-unlocking control means which, when the portable unit receives the first signal and does not receive the second signal, unlocks the door of the one side portion in dependence on the third signal received by the reception means.

According to the door unlocking controller of the present invention, under the condition that a person holding a portable unit is near one of the left and right doors of a vehicle, even when another person not having the portable unit inputs a request to unlock the other door, the unlocking of that door is not performed and therefore the unlocking of doors by the person not having the portable unit can be prevented. Thus, vehicle security can be enhanced.

In the door unlocking controller of the present invention, it is preferable that when receiving the first signal and not receiving the second signal, the aforementioned portable unit send back the third signal.

Note that when vehicle ID given to the vehicle is contained in the first signal, then the portable unit checks if the vehicle ID corresponds to portable-unit ID given to the portable unit, and they correspond, it is preferable to send back the aforementioned third signal.

In this case, it is preferable that when the aforementioned third signal is received by the reception means, the aforementioned door-unlocking control part unlock the door of the aforementioned one side portion. In addition, when the portable-unit ID is contained in the third signal sent back from the portable unit, then the door-unlocking control part checks if the portable-unit ID and the vehicle ID correspond to each other, and they correspond, it is preferable to unlock the door of the aforementioned one side portion.

In the door unlocking controller of the present invention, it is preferable that the portable unit send back a fourth signal when it receives the first signal as the third signal and that it send back a fifth signal when it receives the second signal as the third signal. It is also preferable that the door-unlocking control means unlock the door of the aforementioned one side portion in dependence on the fourth signal when it does not receive the fifth signal.

In the door unlocking controller of the present invention, it is preferable that the third signal contain portable-unit ID for specifying the portable unit. It is also preferable that the door-unlocking control means check if the portable-unit ID corresponds to vehicle ID given to the vehicle, and unlock the door of the aforementioned one side portion if they correspond to each other.

In the door unlocking controller of the present invention, it is preferable that the transmission control means cause the transmission means of the one side portion to transmit the first signal to a first predetermined region having the one side portion as a center thereof and also cause the transmission means of the other side portion to transmit the second signal to a second predetermined region having the other side portion as a center thereof. It is also preferable that the transmission control means set power for transmitting the second signal so that the second predetermined region becomes larger than a first leakage region where the first signal leaks out from the other side portion, and so that a second leakage region where the second signal leaks out from the one side portion becomes a minimum region.

In accordance with another important aspect of the present invention, there is provided a method of controlling unlocking of a door of a vehicle that includes input means provided in both side portions of the vehicle for requesting the unlocking of the door and transmission means provided in the side portions of the vehicle. The method includes a transmission control step which, when a request to unlock the door is input through the input means provided in one of the side portions of the vehicle, causes the transmission means provided in the one side portion to transmit a first signal and also causes the transmission means provided in the other side portion to transmit a second signal; and a step of sending back a third signal in dependence on the first signal and the second signal by a portable unit. The method further includes a reception step of receiving the third signal sent back from the portable unit by reception means provided in the vehicle; and a door-unlocking control step of unlocking the door of the one side portion in dependence on the third signal received by the reception means, when the portable unit receives the first signal and does not receive the second signal.

According to the door-unlocking control method of the present invention, under the condition that a person holding a portable unit is near one of the left and right doors of a vehicle, even when another person not having the portable unit inputs a request to unlock the other door, the unlocking of that door is not performed and therefore the unlocking of doors by the person not having the portable unit can be prevented. Thus, vehicle security can be enhanced.

In a preferred form of the method of the present invention, the step of sending back the third signal sends back the third signal, when the first signal is received and the second signal is not received.

In another preferred form of the method of the present invention, the step of sending back the third signal sends back a fourth signal from the portable unit when the first signal is received as the third signal, and sends back a fifth signal from the portable unit when the second signal is received as the third signal. Also, the door-unlocking control step unlocks the door of the one side portion in dependence on the fourth signal when the fifth signal is not received.

In still another preferred form of the method of the present invention, the third signal contains portable-unit ID for specifying the portable unit, and the door-unlocking control step checks if the portable-unit ID corresponds to vehicle ID given to the vehicle, and unlocks the door of the one side portion if they correspond to each other.

In a further preferred form of the method of the present invention, the transmission control step causes the transmission means of the one side portion to transmit the first signal to a first predetermined region having the one side portion as a center thereof, and also causes the transmission means of the other side portion to transmit the second signal to a second predetermined region having the other side portion as a center thereof, and sets power for transmitting the second signal so that the second predetermined region becomes larger than a first leakage region where the first signal leaks out from the other side portion, and so that a second leakage region where the second signal leaks out from the one side portion becomes a minimum region.

BRIEF DESCRIPTION OF THE DRAWINGS

The present invention will be described in further detail with reference to the accompanying drawings wherein.

DETAILED DESCRIPTION OF THE INVENTION

Embodiments of the present invention will hereinafter be described in detail with reference to the drawings.

(A) FIRST EMBODIMENT

Figure 1:
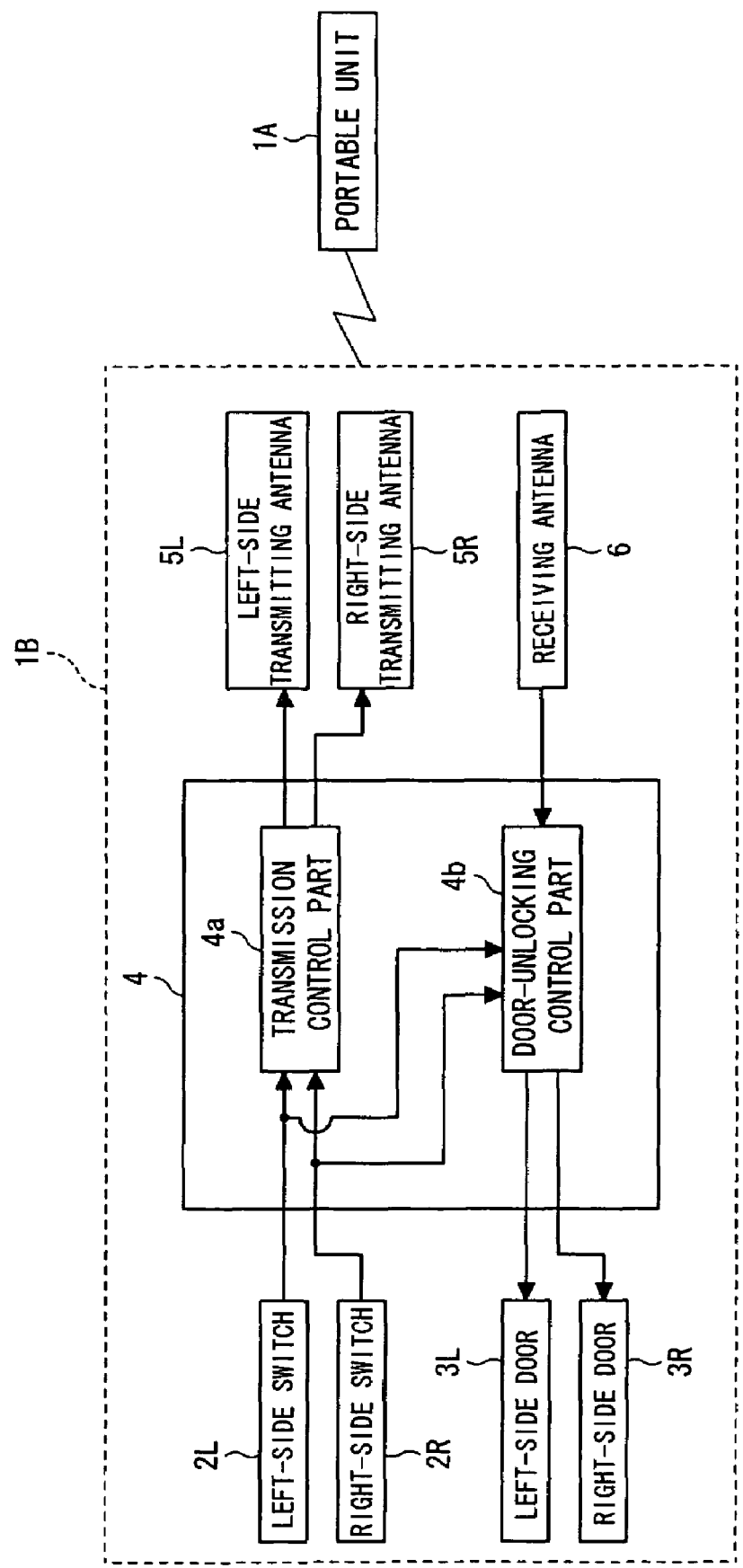
FIG. 1 is a block diagram showing a door unlocking controller for a vehicle constructed in accordance with a first embodiment of the present invention.
Figure 2:
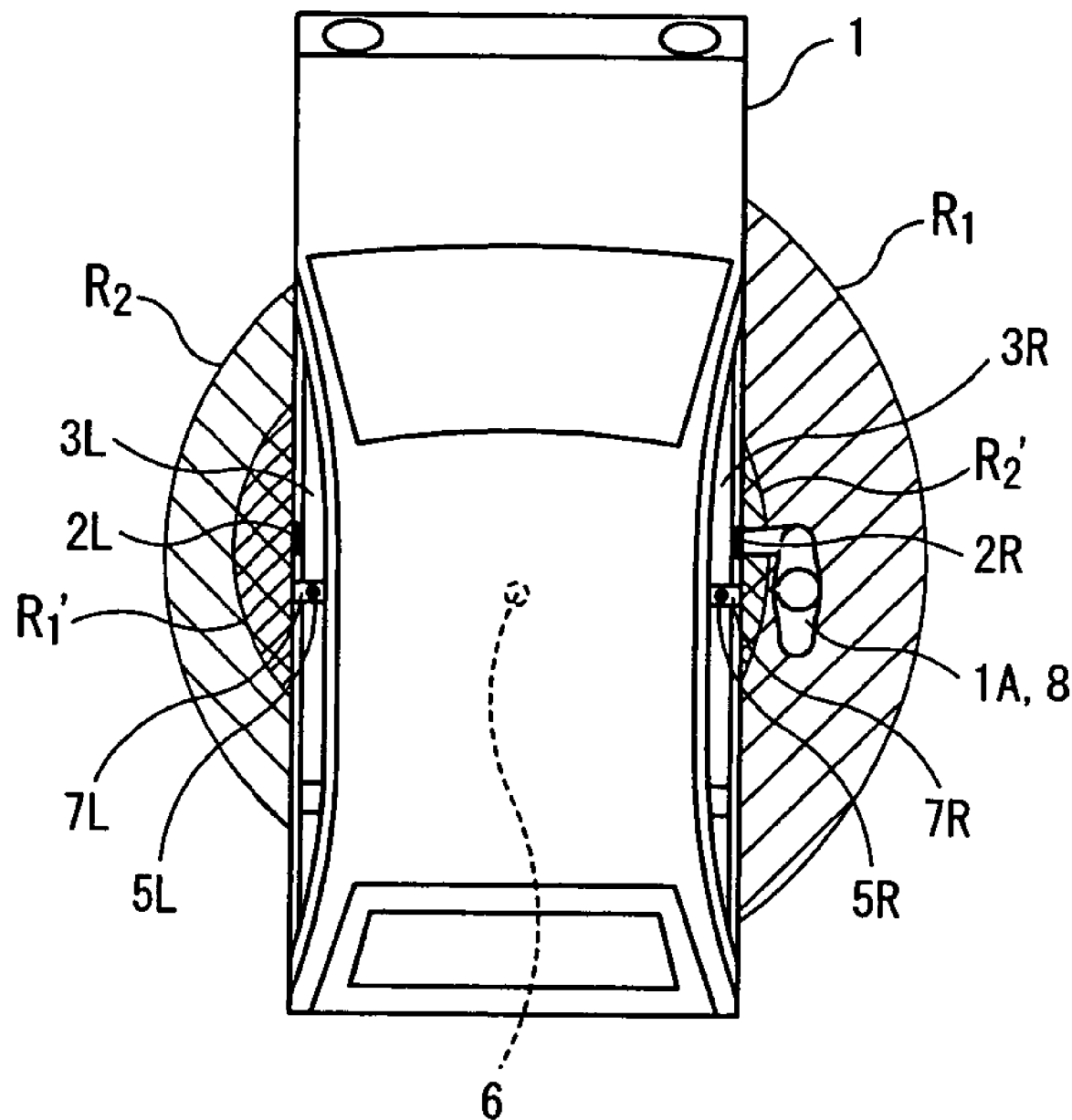
FIG. 2 is a top view used to explain the construction of the door unlocking controller of the first embodiment of the present invention.

Referring to FIGS. 1 and 2, there is shown a door unlocking controller for a vehicle constructed in accordance with a first embodiment of the present invention.

FIG. 1 is a block diagram and FIG. 2 is a top view showing a door unlocking controller for a vehicle. As shown in the figures, the door unlocking controller according to this embodiment is a door unlocking controller for a vehicle 1, which controls the unlocking of the left-side door 3L and right-side door 3R of the vehicle 1 by checking if the vehicle ID given to the vehicle 1 corresponds to the portable-unit ID given to a portable unit 1A. The door unlocking controller is equipped with a vehicle-side system 1B, and a portable unit 1A capable of transmission and reception. The vehicle-side system 1B mainly includes door switches (input means) 2L and 2R, an electronic control unit (ECU) 4 having functions equivalent to a transmission control part (transmission control means) 4a and a door-unlocking control part (door-unlocking control means) 4b, transmitting antennas (transmission means) 5L and 5R, and a receiving antenna (reception means) 6. Note that the ECU 4 is made up of an input-output device, storage devices (RAM, ROM, etc.) with processing programs, a central processing unit (CPU), etc, which are not shown.

The left-side door switch 2L and right-side door switch 2R are provided near the knobs of the left-side door 3L and right-side door 3R of the vehicle 1, respectively. For example, the door switches 2L and 2R are constructed as push-button door switches. If either the left-side door switch 2L or the right-side door switch 2R is made on, a signal to request the unlocking of the door on the switch-operated side is transmitted to the transmission control part 4a.

The left-side transmitting antenna 5L and right-side transmitting antenna 5R are installed on the left-side center pillar 7L and right-side center pillar 7R of the vehicle 1, respectively. The signals from the transmitting antennas 5L and 5R are controlled by the control signals from the transmission control part 4a.

In the transmission control part 4a, if a request to unlock the right-side door 3R is input through the right-side door switch 2R with the doors 3L and 3R locked, an ID request signal (first signal) to request portable-unit ID is transmitted from the right-side transmitting antenna 5R, and an alarm signal (second signal) differing from the ID request signal is transmitted from the left-side transmitting antenna 5L. Also, if a request to unlock the left-side door 3L is input through the left-side door switch 2L, an ID request signal is transmitted from the left-side transmitting antenna 5L, and an alarm signal is transmitted from the right-side transmitting antenna 5R. Note that the ID request signal and alarm signal may be transmitted at the same time, or at slightly different times.

In addition, in the transmission control part 4a, power for transmitting an ID request signal is set so the ID request signal can be transmitted from the transmitting antennas 5L and 5R to a predetermined region. Therefore, as shown in FIG. 2, if a request to unlock the right-side door 3R is input through the right-side door switch 2R of the vehicle 1, the ID request signal is transmitted to a predetermined region (first predetermined region) $R_1$ having the right-side transmitting antenna 5R as the center. At this time, the ID request signal leaks out to the left side of the vehicle 1 (an ID-signal leakage region $R_1'$ in FIG. 2), but in the transmission control part 4a, power to transmit an alarm signal is set so that an alarm-signal transmission region $R_2$ where the alarm signal is transmitted from the left-side transmitting antenna 5L becomes larger than the ID-signal leakage region $R_1'$ where the ID request signal leaks out, and so that an alarm-signal leakage region $R_2'$ where the alarm signal leaks out becomes a minimum region.

Thus, the power to transmit the ID request signal is determined by the size of the ID-signal transmission region $R_1$ where the ID request signal is transmitted. Also, in dependence on the ID-signal leakage region $R_1'$, the alarm-signal transmission region $R_2$ and the power to transmit the alarm signal are set.

The portable unit 1A is used to send and receive signals directly to and from the vehicle-side system 1B by radio. This portable unit 1A stores the same ID as the vehicle ID given to the vehicle 1, or portable-unit ID that corresponds to the vehicle ID. Typically, the ID of one portable unit 1A corresponds to the ID of one vehicle 1.

The portable unit 1A is also constructed, such that it can receive both an ID request signal and an alarm signal. The portable unit 1A is basically constructed to send back a portable-unit signal when it receives an ID request signal, but when an alarm signal is received together with an ID request signal, it is constructed so as not to send back the portable-unit signal. In other words, the portable unit 1A sends back a portable-unit signal only when it receives an ID request signal and does not receive an alarm signal. That is, when the portable unit 1A receives an alarm signal, this means that a person not having the portable unit 1A has input a request to unlock the opposite door. Also, the portable unit 1A according to this embodiment is constructed to send back a portable-unit signal containing portable-unit ID. It is a matter of course that when an ID request signal is not received, the portable unit 1A does not send back the portable-unit signal.

The receiving antenna 6 is installed, for example, within the vehicle 1 so it can receive the portable-unit signal sent back from the portable unit 1A.

The door-unlocking control part 4b is used to control the unlocking of the left-side door 3L or right-side door 3R in dependence on both the portable-unit signal received by the receiving antenna 6 and the operation information on the left-side door switch 2L and right-side door switch 2R. More specifically, the door-unlocking control part 4b checks if the portable-unit ID contained in the portable-unit signal received by the receiving antenna 6 corresponds to the vehicle ID given to the vehicle 1. If the portable-unit ID and the vehicle ID correspond to each other, the door on the side where the door switch 2L or 2R has been operated (e.g., the right-side door 3R in FIG. 2) is unlocked. Note that if vehicle ID is previously stored in the door-unlocking control part 4b, or is previously stored in a storage device of the ECU 4, the door-unlocking control part 4b can check if the vehicle ID and the portable-unit ID correspond to each other, by referring to the stored vehicle ID.

Figure 3:
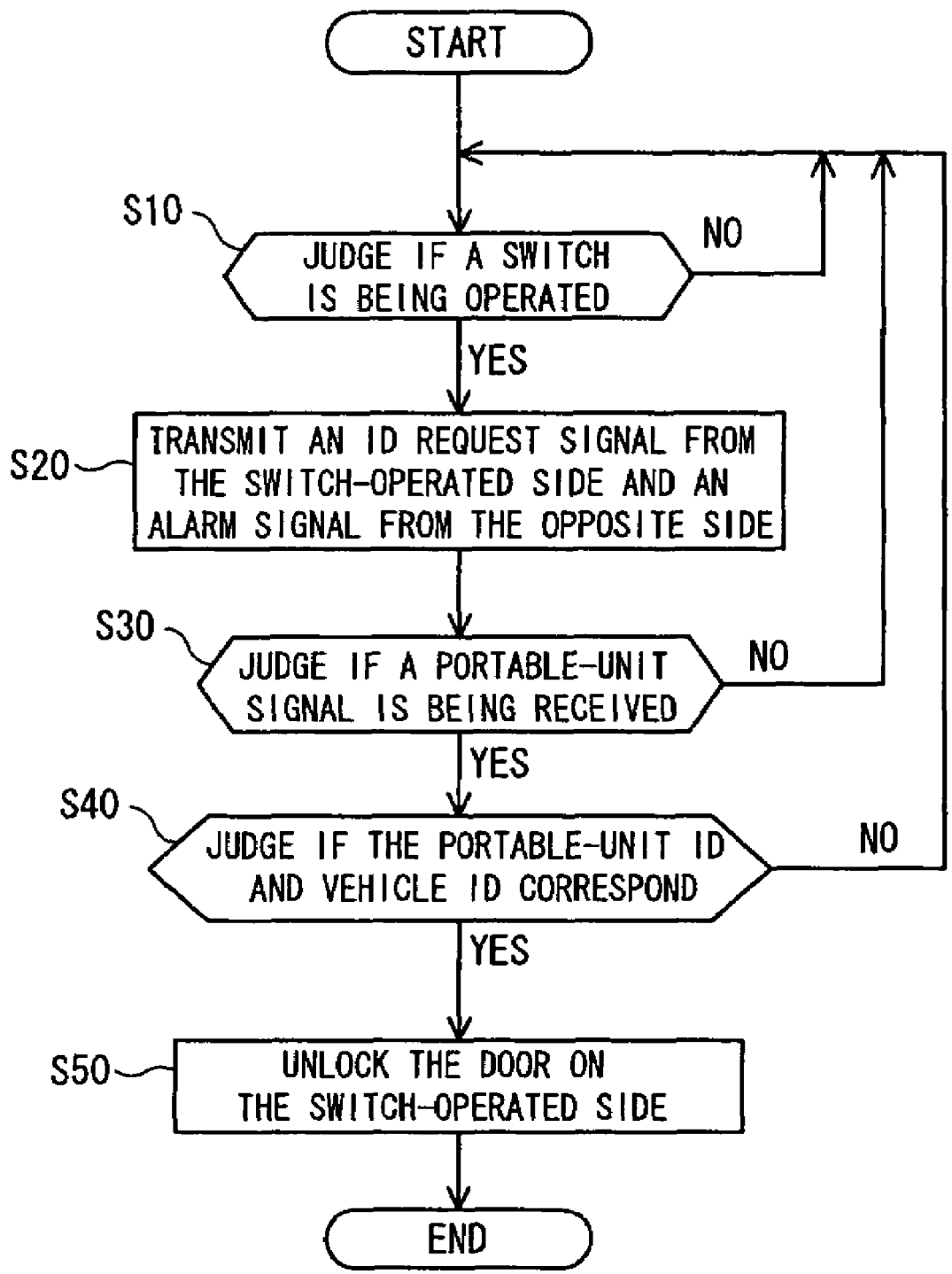
FIG. 3 is a flowchart showing how a door is unlocked according to the first embodiment of the present invention.

Because the door unlocking controller of the first embodiment of the present invention is constructed as described above, a vehicle door is unlocked along the processing steps shown in FIG. 3.

As shown in the figure, it is judged if the door switch 2L or 2R is being operated with the doors 3L and 3R locked (step S10). If the door switch 2R (2L) is being operated, an ID request signal is transmitted from the transmitting antenna 5R (5L) on the switch-operated side, and an alarm signal is transmitted from the transmitting antenna 5L (5R) on the opposite side (step S20). Thereafter, it is judged if the receiving antenna 6 is receiving a portable-unit signal (step S30). If the portable-unit signal is being received, it is judged if the portable-unit ID and the vehicle ID correspond to each other (step S40). If they correspond, the door 3R (3L) on the side of the door switch 2R (2L) operated is unlocked (step S50).

A description will be given of how a door is unlocked according to the first embodiment, with reference to FIG. 2. If a person 8 who holds a portable unit 1A (e.g., a driver who owns the vehicle 1) operates the right-side door switch 2R and inputs a request to unlock the right-side door 3R, an ID request signal is transmitted from the right-side transmitting antenna 5R and an alarm signal is transmitted from the left-side transmitting antenna 5L. In the case of FIG. 2, a portable-unit holder 8 is inside the ID-signal transmission region $R_1$ and outside the alarm-signal leakage region $R_2'$, so the portable unit 1A receives only the ID request signal. This allows the portable unit 1A to send back a portable-unit signal containing the portable-unit ID. And the receiving antenna 6 of the vehicle 1 receives the portable-unit signal and judges if the portable-unit ID and the vehicle ID correspond to each other. If they correspond, the right-side door 3R on the side of the door switch 2R operated by the portable-unit holder 8 is unlocked.

Although the alarm-signal leakage region $R_2'$ is set to a minimum region, it is further preferable that when operating the door switch 2L or 2R, the portable-unit holder 8 do not move too close to the door 3L or 3R so that the portable unit 1A is not inside the alarm-signal leakage region $R_2'$.

The door unlocking controller according to the first embodiment is capable of enhancing vehicle security (safety and prevention of crimes), as set forth below.

Figure 4:
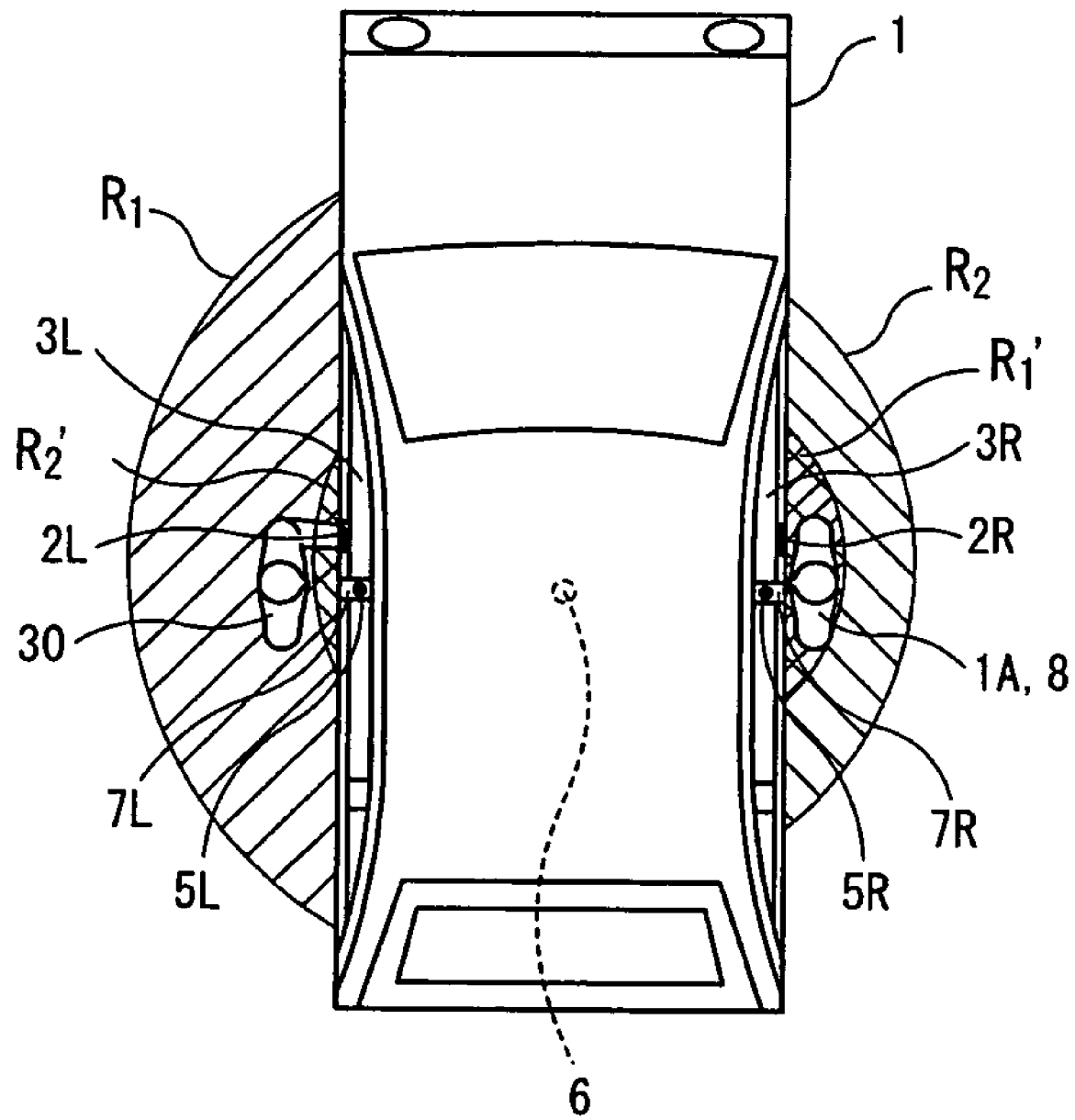
FIG. 4 is a top view used for explaining the advantages of the door unlocking controller constructed in accordance with the first embodiment of the present invention.

For instance, as shown in FIG. 4, if a person 30 not having a portable unit 1A operates the left-side door switch 2L and inputs a request to unlock the left-side door 3L, an ID request signal is transmitted from the left-side transmitting antenna 5L and an alarm signal is transmitted from the right-side transmitting antenna 5R. In the above-described conventional technique, if a portable-unit holder 8 is inside the ID-signal leakage region $R_1'$, there is a possibility that the portable unit 1A will send back a portable-unit signal and therefore the left-side door 3L will be unlocked. However, in the door unlocking controller of the first embodiment, if the portable unit 1A receives an alarm signal, it does not send back a portable-unit signal. Therefore, even when the portable-unit holder 8 is inside the ID-signal leakage region $R_1'$ (i.e., even when the portable unit 1A receives the ID signal), there is no possibility that a portable-unit signal will be sent back and therefore the left-side door 3L will be unlocked against the intention of the portable-unit holder 8.

Thus, according to the door unlocking controller of the first embodiment, under the condition that the person 8 holding the portable unit 1A is near one of the two doors 3R and 3L, even when the person 30 not having the portable unit 1A inputs a request to unlock the other door, the unlocking of that door is not performed and therefore the unlocking of doors by the person 30 not having the portable unit 1A can be prevented. Thus, vehicle security can be enhanced.

In the first embodiment, while the vehicle-side system 1B judges if a door is unlocked by checking if the portable-unit ID and the vehicle ID correspond to each other, these processing steps may be carried out by the portable unit 1A. In this case, the ID request signal (first signal) transmitted from the vehicle 1 contains the vehicle ID. The portable unit 1A checks if the vehicle ID contained in the ID request signal corresponds to the portable-unit ID. If they correspond to each other, the portable unit 1A sends back a portable-unit signal (third signal) for allowing the unlocking of a door. If the receiving antenna 6 receives that portable-unit signal, the door on the switch-operated side is unlocked. Or the signal sent back from the portable unit 1A may contain the portable-unit ID. If the receiving antenna 6 receives the portable-unit signal, the door-unlocking control part 4b also checks if the portable-unit ID and the vehicle ID correspond to each other. If they correspond, the door on the switch-operated side is unlocked. In this case, security can be further enhanced.

(B) SECOND EMBODIMENT

A description will hereinafter be given of a door unlocking controller constructed in accordance with a second embodiment of the present invention.

In the first embodiment, if the portable unit 1A receives an ID request signal and does not receive an alarm signal, a portable-unit signal is sent back from the portable unit 1A. In the second embodiment, if an ID request signal is received as a portable-unit signal (third signal), an ID-request-received signal (fourth signal) containing portable-unit ID is sent back. Also, if an alarm signal is received, an alarm-received signal (fifth signal) is sent back.

That is, in the first embodiment, even if the portable unit 1A receives an ID request signal, it does not send back a portable-unit signal if it receives an alarm signal. However, in the second embodiment, even if the portable unit 1A receives an alarm signal, a portable-unit signal is sent back. In addition, at least either the above-described ID-request-received signal or alarm-received signal is sent back as the portable-unit signal.

In the door-unlocking control part 4b, when the receiving antenna 6 is not receiving the alarm-received signal, the door on the switch-operated side is unlocked in dependence on the ID-request-received signal. That is, when the receiving antenna 6 is not receiving the alarm-received signal at the same time as when the ID-request-received signal is received, or when the receiving antenna 6 is not receiving the alarm-received signal within a predetermined time (very short time) before and after when the ID-request-received signal is received, it is checked if the vehicle ID and the portable-unit ID correspond to each other. If they correspond, the door on the switch-operated side is unlocked. In other words, even when the receiving antenna 6 receives the ID-request-received signal, the unlocking of a door is not performed, if the receiving antenna 6 receives the alarm-received signal in addition to the ID-request-received signal.

Figure 5:
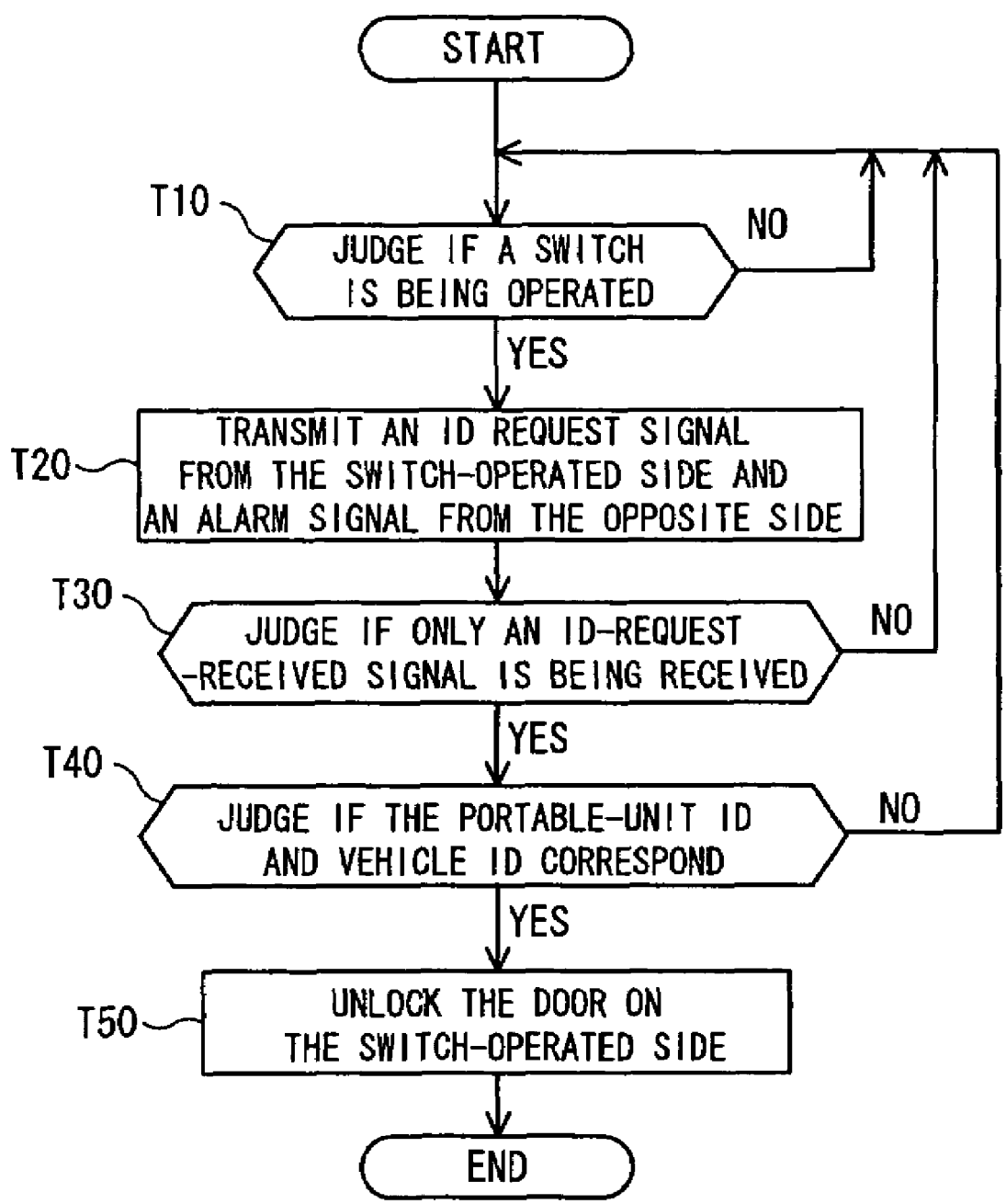
FIG. 5 is a flowchart showing how a door is unlocked according to a second embodiment of the present invention.
Figure 6:
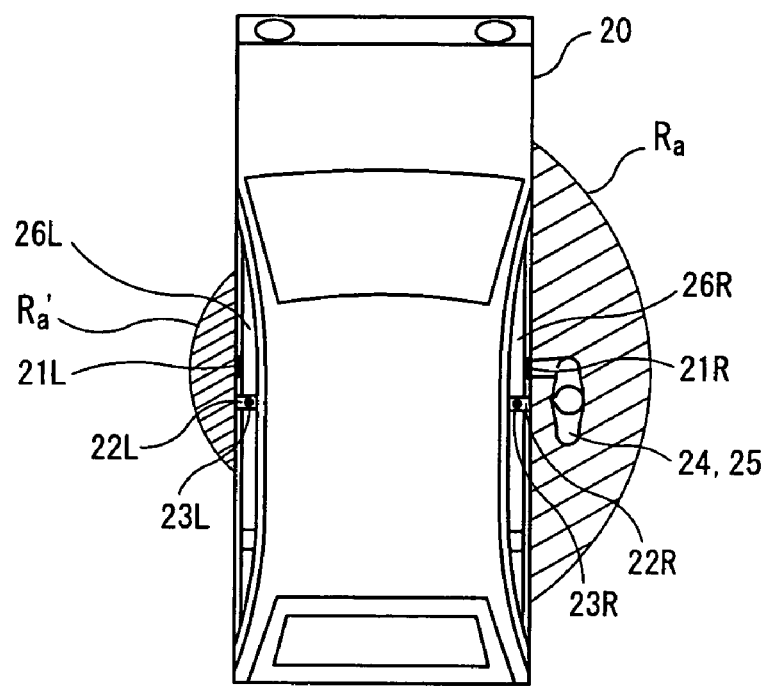
FIG. 6 is a top view showing a conventional door unlocking controller for a vehicle.
Figure 7:
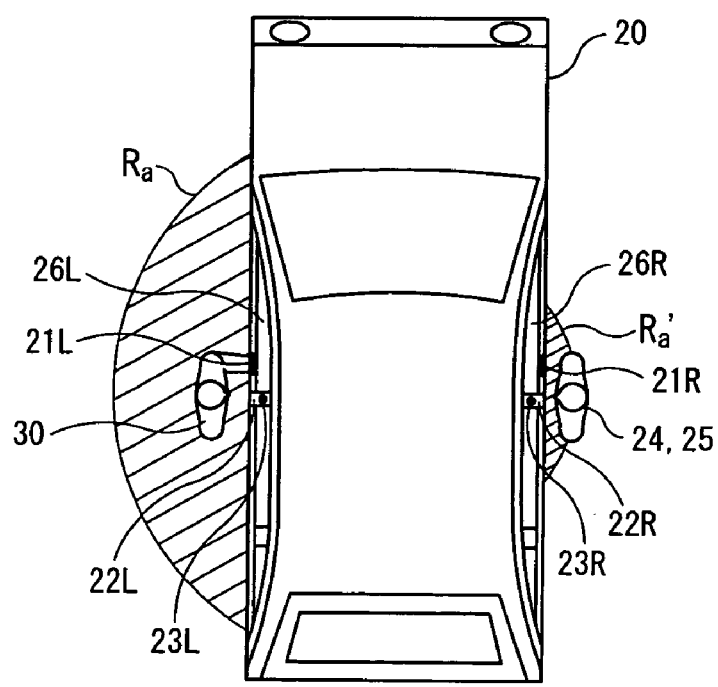
FIG. 7 is a top view used to explain problems found in the conventional door unlocking controller.

Because the door unlocking controller of the second embodiment of the present invention is constructed as set forth above, a vehicle door is unlocked along the processing steps shown in FIG. 5.

As shown in the figure, it is judged if the door switch 2L or 2R is being operated with the doors 3L and 3R locked (step T10). If the door switch 2R (2L) is being operated, an ID request signal is transmitted from the transmitting antenna 5R (5L) on the switch-operated side, and an alarm signal is transmitted from the transmitting antenna 5L (5R) on the opposite side (step T20). Thereafter, it is judged if the receiving antenna 6 is receiving only an ID-request-received signal as a portable-unit signal (step T30). If only the ID-request-received signal is being received, it is judged if the portable-unit ID and the vehicle ID correspond to each other (step T40). If they correspond, the door 3R (3L) on the side of the door switch 2R (2L) operated is unlocked (step T50). Thus, the door unlocking controller of the second embodiment is capable of enhancing vehicle security (safety and prevention of crimes), as with the first embodiment. In addition, since the portable unit 1A of the second embodiment does not judge if a portable-unit signal is sent back, the portable unit 1A does not need to have the above-described function of judging signals. Thus, the portable unit 1A can be made structurally simpler and the cost can be reduced.

(C) OTHERS

While the present invention has been described with reference to the preferred embodiments thereof, the invention is not to be limited to the details given herein, but may be modified within the scope of the invention hereinafter claimed.

For example, in the first and second embodiments, although one receiving antenna 6 is installed within the vehicle 1, the receiving antenna 6 may be installed on, for instance, each of the center pillars 7L and 7R. In addition, the left-side transmitting antenna 5L and right-side transmitting antenna 5R may be constructed as a left-side transmitting-receiving antenna and a right-side transmitting-receiving antenna, respectively.

What is claimed is:

1. A door unlocking controller for controlling unlocking of a door of a vehicle, comprising:
   input means provided in both side portions of said vehicle for requesting the unlocking of said door;
   transmission means provided in the side portions of said vehicle;
   transmission control means which, when a request to unlock said door is input through said input means provided in one of the side portions of said vehicle, causes said transmission means provided in said one side portion to transmit a first signal and also causes said transmission means provided in the other side portion to transmit a second signal;
   a portable unit for sending back a third signal in dependence on said first signal and said second signal;
   reception means provided in said vehicle for receiving said third signal sent back from said portable unit; and
   door-unlocking control means which, when said portable unit receives said first signal and does not receive said second signal, unlocks said door of said one side portion in dependence on said third signal received by said reception means.

2. The door unlocking controller as set forth in claim 1, wherein said portable unit sends back said third signal, when said portable unit receives said first signal and does not receive said second signal.

3. The door unlocking controller as set forth in claim 1, wherein
   said portable unit sends back a fourth signal when said portable unit receives said first signal as said third signal, and also sends back a fifth signal when said portable unit receives said second signal as said third signal; and
   said door-unlocking control means unlocks the door of said one side portion in dependence on said fourth signal when said door-unlocking control means does not receive said fifth signal.

4. The door unlocking controller as set forth in claim 1, wherein said third signal contains portable-unit ID for specifying said portable unit; and
   said door-unlocking control means checks if said portable-unit ID corresponds to vehicle ID given to said vehicle, and unlocks the door of said one side portion if they correspond to each other.

5. The door unlocking controller as set forth in claim 1, wherein said transmission control means causes said transmission means of said one side portion to transmit said first signal to a first predetermined region having said one side portion as a center thereof and also causes said transmission means of said other side portion to transmit said second signal to a second predetermined region having said other side portion as a center thereof, and sets power for transmitting said second signal so that said second predetermined region becomes larger than a first leakage region where said first signal leaks out from said other side portion, and so that a second leakage region where said second signal leaks out from said one side portion becomes a minimum region.

6. A method of controlling unlocking of a door of a vehicle that includes input means provided in both side portions of said vehicle for requesting the unlocking of said door and transmission means provided in the side portions of said vehicle, said method comprising:
   a transmission control step which, when a request to unlock said door is input through said input means provided in one of the side portions of said vehicle, causes said transmission means provided in said one side portion to transmit a first signal and also causes said transmission means provided in the other side portion to transmit a second signal;
   a step of sending back a third signal in dependence on said first signal and said second signal by a portable unit;
   a reception step of receiving said third signal sent back from said portable unit by reception means provided in said vehicle; and
   a door-unlocking control step of unlocking said door of said one side portion in dependence on said third signal received by said reception means, when said portable unit receives said first signal and does not receive said second signal.

7. The method as set forth in claim 6, wherein said step of sending back said third signal sends back said third signal, when said first signal is received and said second signal is not received.

8. The method as set forth in claim 6, wherein said step of sending back said third signal sends back a fourth signal from said portable unit when said first signal is received as said third signal, and sends back a fifth signal from said portable unit when said second signal is received as said third signal; and said door-unlocking control step unlocks the door of said one side portion in dependence on said fourth signal when said fifth signal is not received.

9. The method as set forth in claim 6, wherein said third signal contains portable-unit ID for specifying said portable unit; and said door-unlocking control step checks if said portable-unit ID corresponds to vehicle ID given to said vehicle, and unlocks the door of said one side portion if they correspond to each other.

10. The method as set forth in claim 6, wherein said transmission control step causes said transmission means of said one side portion to transmit said first signal to a first predetermined region having said one side portion as a center thereof, and also causes said transmission means of said other side portion to transmit said second signal to a second predetermined region having said other side portion as a center thereof, and sets power for transmitting said second signal so that said second predetermined region becomes larger than a first leakage region where said first signal leaks out from said other side portion, and so that a second leakage region where said second signal leaks out from said one side portion becomes a minimum region.

11. A door unlocking controller for controlling unlocking of a door of a vehicle, comprising:

input means individually provided in both side portions of said vehicle for inputting a request for unlocking said door;

a plurality of transmission means individually provided at each of the side portions;

transmission control means for controlling one of said transmission means provided in one of the side portions to transmit a first signal and also for controlling said transmission means provided in another side portions to transmit a second signal, when the request for unlocking said door is input by said input means provided in one of the side portions of said vehicle;

a portable unit for sending a third signal in dependence on receiving of said first signal or said second signal;

reception means provided in said vehicle for receiving said third signal sent from said portable unit; and door-unlocking control means for unlocking said door when said portable unit receives said first signal without said second signal and said reception means receives said third signal, wherein, said portable unit sends a fourth signal when as said third signal independency on receiving said first signal, and also sends a fifth signal as said third signal in dependency on receiving said second signal, and said door-unlocking control means unlocks said door in dependence on receiving said fourth signal without said fifth signal.

* * * * *